United States Patent [19]

Borsch et al.

[11] Patent Number: 5,767,794
[45] Date of Patent: Jun. 16, 1998

[54] TRAFFIC SURVEILLANCE PROCESS AND DEVICE

[75] Inventors: Manfred Borsch, Pohlheim; Reiner Pfaff, Dillenburg, both of Germany

[73] Assignee: Leica Sensortechnik GmbH, Wetzlar, Germany

[21] Appl. No.: 578,547

[22] PCT Filed: Jul. 22, 1994

[86] PCT No.: PCT/DE94/00854

§ 371 Date: Jan. 24, 1996

§ 102(e) Date: Jan. 24, 1996

[87] PCT Pub. No.: WO95/04982

PCT Pub. Date: Feb. 16, 1995

[30] Foreign Application Priority Data

Aug. 6, 1993 [DE] Germany ............. 43 26 398.4

[51] Int. Cl.[6] ................................................ G08G 1/017
[52] U.S. Cl. ................. 340/937; 340/936; 340/942; 340/905; 348/148; 348/149; 364/436; 364/438
[58] Field of Search .......................... 340/937, 936, 340/933, 942, 905; 348/148, 149; 364/436, 438; 352/113

[56] References Cited

U.S. PATENT DOCUMENTS

| 2,619,402 | 10/1952 | McCrulcheon | 340/937 |
| 4,173,010 | 10/1979 | Hoffmann | 340/937 |
| 4,199,232 | 4/1980 | Olodort | 352/113 |
| 4,214,265 | 7/1980 | Olesen | 358/93 |
| 4,717,815 | 1/1988 | Goede | 342/66 |
| 4,866,438 | 9/1989 | Knisch | 340/936 |
| 4,988,994 | 1/1991 | Loeven | 340/937 |
| 5,515,042 | 5/1996 | Nelson | 340/937 |

FOREIGN PATENT DOCUMENTS

| 0 188 694 | 7/1986 | European Pat. Off. . |
| 0 312 524 | 4/1989 | European Pat. Off. . |
| 1 805 903 | 5/1969 | Germany . |
| 26 46 636 | 4/1977 | Germany . |
| 37 16 319 | 8/1988 | Germany . |
| 39 08 069 | 9/1990 | Germany . |
| 40 32 459 | 4/1992 | Germany . |

*Primary Examiner*—Jeffery Hofsass
*Assistant Examiner*—Julie B. Lieu
*Attorney, Agent, or Firm*—Foley & Lardner

[57] ABSTRACT

A traffic surveillance system measures a speed of a vehicle within a traffic scene, optically records the traffic scene, and reproduces the traffic scene on a display in synchronism with a display of the measured speed. The system includes a speed sensor which measures the speed of the vehicle within the traffic scene and an electro-optical camera having a recording medium in which video signals representing the traffic scene are stored. The camera is equipped with an audio input and output connected to a soundtrack of the recording medium. The audio input receives modulated signals of the measured speed for storage in the soundtrack in synchronism with the video signals. The measured speed signals and the video signals are combined in a video mixer and reproduced on the display.

10 Claims, 1 Drawing Sheet

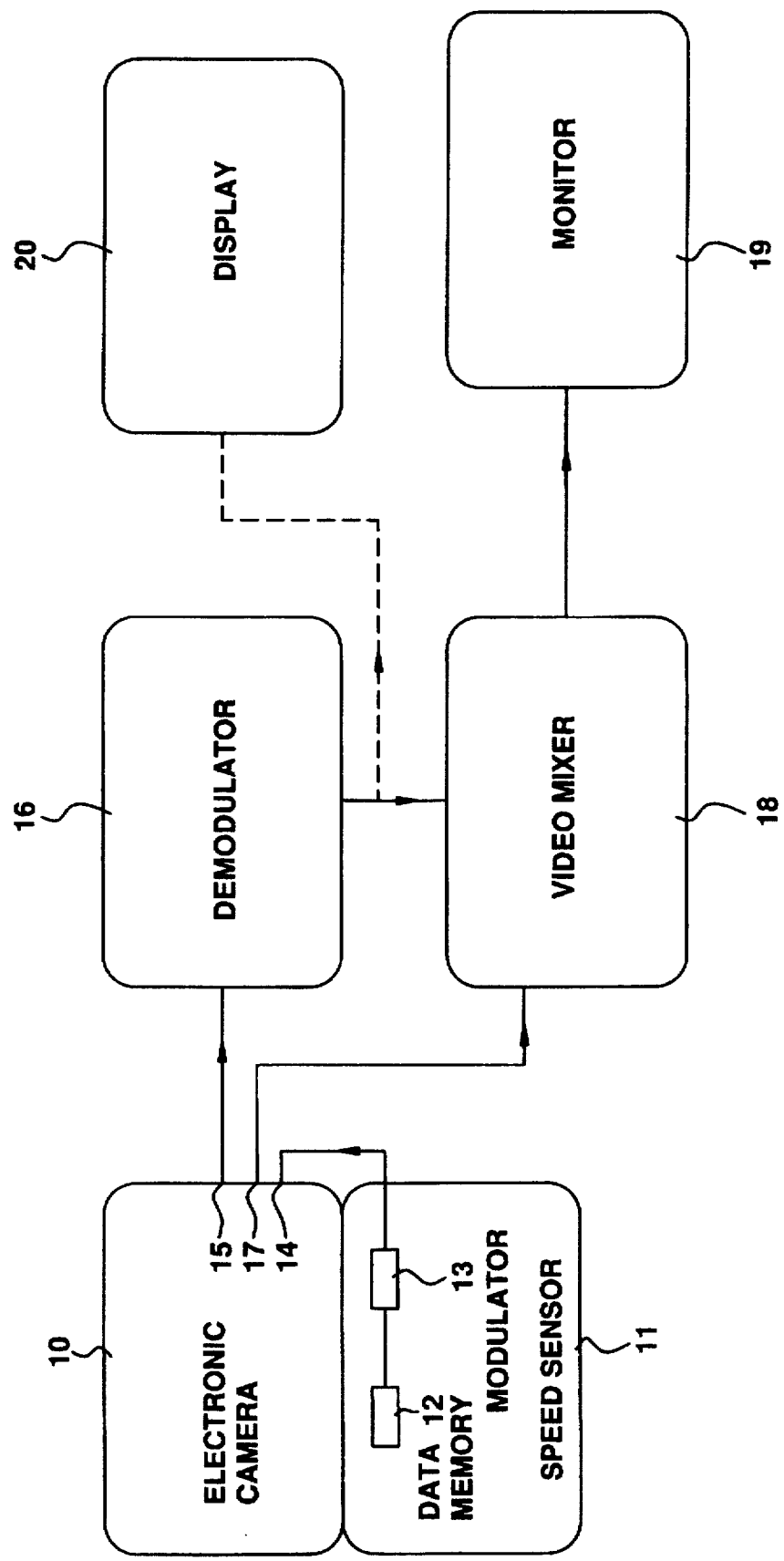

TRAFFIC SURVEILLANCE PROCESS AND DEVICE

This application is based on international application PCT/DE94/00854, which designated the United States of America and which was filed on Jul. 22, 1994.

BACKGROUND OF THE INVENTION

1. Field of the Invention

The invention relates to a process and a device for traffic surveillance.

2. Description of the Related Art

DE 40 32 459 A1 discloses a process and a device for determining and recording vehicle speeds for the purpose of traffic surveillance, using an electronic camera having a memory, a computing circuit for calculating the vehicle speed and a reproduction device. The electronic camera, operating on the basis of CCD elements, is provided with two objectives which can be adjusted with respect to each other in terms of their acceptance angle. At defined points in time, images of the vehicle are recorded, stored in electronic devices and processed. In detail, a first image of the vehicle is acquired using the first objective of the camera, is temporarily stored and is compared with a second image from the first objective, the vehicle speed being calculated in the computing circuit from the lateral offset between the two images. Using the second objective, the license number is acquired, is displayed with further data in the viewfinder image and is stored. The control of the storage of the images from the second objective can be carried out automatically by means of the computing circuit, and the stored images and data can then be displayed on a monitor.

Furthermore, EP-0 188 694 A2 discloses a process and a device for the photographic recording of vehicles by means of a speed measuring device which is equipped with an image recording device, oncoming vehicles being measured and recorded in image form. After the entry of a vehicle into a measurement section, a specific speed measured value is determined and the image recording device is triggered, while inserting the value into the recording. Subsequently, in a further measurement section, the measurement signal, which is generated there, is evaluated further and the result is used for checking the speed value measured initially. Using this known arrangement, a high measurement reliability is achieved. The image recording device can be an electronic video camera having a magnetic recording medium. A Doppler radar measurement device, which generates a Doppler signal, of which the frequency is proportional to the relative speed between vehicle and radar device, from the transmitted radiation and the radiation reflected by the vehicle in a manner disclosed in DE-B 1 805 903 by superimposing on part of the transmitting energy the received energy reflected from the vehicle. The recording camera requires its own data insertion device which is driven via an input/output stage of a microcomputer which, as a function of the checking, triggers either the insertion of the speed measured value or the annulment of the measurement and a subsequent further transport of the recording medium.

DE 39 08 069 A1 discloses a device for measuring, recording and indicating the vehicle speed. The device comprises a video camera with a range measuring device fastened thereto. The measured range values are fed to a microprocessor which calculates the speed of the vehicle therefrom. This value is fed to a memory which is connected to the microprocessor and which is connected to an insertion device arranged in the video camera. The insertion device inserts the measured speed values and, if appropriate, the date and the time as well, into the video image. In the case of this device, too, a special insertion device is necessary in order to be able to display the speed data in the video image and to record the data with the latter.

DE 26 46 636 C2 discloses a process for the surveillance of the speed of a vehicle, in which the passage time of the vehicle through the image region of a television camera is measured. When the vehicle enters the image region of the measuring television camera, a pulse generator is triggered. The counting pulses from the generator are counted for as long as the image of the vehicle is located between two generated marking lines in the television image. These marking lines correspond in their nature to a measurement range, so that the actual speed of the vehicle may be determined from the number of pulses and the range. Using a further observation television camera, the traffic scene is recorded. A video tape recording device having two video inputs records the information from both television cameras. The recording device is intended to have, in addition, a sound input for the simultaneous recording of the spoken commentary of the surveillance personnel about the traffic sequence.

DE 37 18 319 C1 discloses a video recorder with which the traffic scene ahead of a vehicle is to be recorded. The recorder also contains a sound recording input which can be switched in from time to time to record data on the state of the vehicle. During this time an additional switching device accesses various on-board systems and feeds their signals to the sound input. In this manner, a tagged record is obtained, of the speed of the vehicle for example, and of the surrounding traffic, which can be used in analyzing student errors in driving schools.

SUMMARY OF THE INVENTION

The invention is based on the object of specifying a process for traffic surveillance of the type mentioned at the outset which records a moving traffic scene over a relatively long period of time. In this process, the speed of a vehicle is measured simultaneously with, and is stored together with, the scene on a recording medium, so that the assignment of a measured value to a vehicle is unequivocally possible and is available at any time by means of reproduction. Furthermore, a device for carrying out the process is to be provided which makes possible, using commercially available devices, namely an electronic camera, a speed sensor and a reproduction device, the recording of a traffic scene and the synchronous measurement of a vehicle speed with simultaneous storage on a conventional recording medium, with subsequent reproduction of the measured values assigned to the scene and, if appropriate, of other data, in a simple manner.

The above object is accomplished with an apparatus for surveying a traffic scene which comprises: a speed sensor for measuring a speed of a vehicle within the traffic scene, a modulator for generating modulated signals which represent the measured speed, an electro-optical camera having a recording medium in which video signals representing the traffic scene are stored and an audio input and output connected to a soundtrack of the recording medium, the audio input receiving the modulated signals for storage on the soundtrack, a demodulator for converting the modulated signals which are received from the audio output of the electro-optical camera into demodulated signals, and a display for displaying the measured speed in accordance with the demodulated signals. A video camera or a camcorder can be used as electronic camera, which record the traffic scene preferably from the front, because of the need for driver identification. A speed sensor is connected to the video camera or the camcorder. The speed sensor essentially comprises an optical pulse transmitter, a photoelectric receiver and a signal processing circuit and is known, for example from EP 0 3 12 524 B1, as a range meter. By means of measuring the propagation time of the transmitted and reflected signals, at specific time intervals the distance is measured and the speed of the vehicle is determined therefrom. This modified range meter advantageously has a memory for a threshold value signal. The signals received by the speed sensor are modulated in a modulator in accordance with the recording frequency of the soundtrack of the video camera and fed to the audio input of the latter, as a result of which storage on the soundtrack in synchronism with the optical storage of the traffic scene on the video tape is achieved. The signals and data stored in this manner are subsequently conditioned in a demodulator in such a manner that they can be fed from its RS-232 (V24) interface as serial data to a video mixer (UNB-232, Videotronic GmbH). The latter serves to insert the measured speed values and, if appropriate, other data such as time, date, permitted maximum speed, etc. The traffic scene can then be viewed and evaluated at any time by means of a monitor.

BRIEF DESCRIPTION OF THE DRAWINGS

An exemplary embodiment of the invention is explained below with reference to FIG. 1 which is a schematic drawing of the traffic surveillance system according to the invention.

DETAILED DESCRIPTION OF A PREFERRED EMBODIMENT

An electronic camera 10, for example a video camera or a camcorder, is connected to a speed sensor 11, which has a measured data memory 12 and a modulator 13. The modulator undertakes a frequency shift keying of the measured data. The modulated data or signals are fed to an audio input 14 of the electronic camera 10 and are stored, together with the video signals, on a recording medium not shown here, for example a video tape. The data which are modulated and stored in this way are fed via an audio output 15 to a demodulator 16, together with the video signals from the video output 17 of the camera 10, to a video mixer 18, in which the insertion of the measurement data takes place. The recorded traffic scene can then be viewed together with the inserted data on a monitor 19.

The speed sensor 11 can be provided in a manner known per se with a memory, not shown here, for a threshold value signal. If the speed of a vehicle which is sighted by means of the sensor 11 lies below this threshold value, no insertion of the measured value takes place. Likewise, the measurement can be annulled if no unequivocal assignment of the measured value to a vehicle is possible, for example because several vehicles are present in the measurement range of the sensor 11.

Instead of displaying the traffic scene with the inserted data on the monitor 19, a separate indication of the demodulated data on a display 20 is also possible (drawn with a dashed line). In this case, the video mixer 18 is not necessary.

Further variants of the invention described herein are possible. Thus, a Doppler radar measurement device can be used as speed sensor, as is described, for example, in DE-B 1 805 903. It is only important that the signals representative of the speed of the vehicle are stored on the soundtrack of the recording medium in synchronism with the optical recording.

We claim:

1. A method of surveying a traffic scene comprising the steps of:

measuring a speed of a vehicle within the traffic scene with a speed sensor and converting the measured speed into modulated signals;

optically recording the traffic scene in a recording medium of an electro-optical camera;

storing said modulated signals on a soundtrack of the recording medium in synchronism with the optically recorded traffic scene; and displaying the optically recorded traffic scene on a reproduction device in synchronism with a display of the measured speed.

2. The method according to claim 1, wherein the steps of measuring and optically recording capture a traffic scene of approaching vehicles.

3. The method according to claim 1, further comprising the steps of:

converting the modulated signals which are stored on the soundtrack into demodulated signals; and mixing the demodulated signals with video signals generated by the step of optically recording prior to the step of displaying.

4. An apparatus for surveying a traffic scene comprising:

a speed sensor to measure a speed of a vehicle within the traffic scene;

a modulator to generate modulated signals which represent the measured speed;

an electro-optical camera having a recording medium in which video signals representing the traffic scene are stored and an audio input and output connected to a soundtrack of the recording medium, said audio input receiving said modulated signals for storage on the soundtrack;

a demodulator to convert the modulated signals which are received from the audio output of said electro-optical camera into demodulated signals; and a display to display the measured speed in accordance with the demodulated signals.

5. The apparatus according to claim 4, further comprising a video mixer for receiving and mixing the demodulated signals and the video signals of the traffic scene, wherein said display receives the mixed signals and reproduces the traffic scene and the measured speed in accordance with the video signals and the demodulated signals.

6. The apparatus according to claim 5, wherein the modulated signals which represent the measured speed are stored in synchronism with the video signals of the traffic scene and the demodulated signals which represent the measured speed are reproduced in synchronism with the video signals of the traffic scene.

7. The apparatus according to claim 4, wherein the speed sensor has a memory for storing a threshold value.

8. The apparatus according to claim 7, wherein said display prevents display of the measured speed if the measured speed is lower than the threshold value.

9. The apparatus according to claim 4, wherein the speed sensor, the electro-optical camera and the modulator are arranged in a common housing.

10. The apparatus according to claim 9, wherein the demodulator is a subassembly which is separate from the common housing for the speed sensor, the electro-optical camera and the modulator.

* * * * *